United States Patent [19]

Chandler et al.

[11] Patent Number: 4,954,940

[45] Date of Patent: Sep. 4, 1990

[54] PLUG IN POWER CONVERTER STRUCTURE

[76] Inventors: Bill B. Chandler, 965 Broadview Pl., Colorado Springs, Colo. 80904; Ramona Z. Olson, 920 N. Cedar St., Colorado Springs, Colo. 80903

[21] Appl. No.: 257,541

[22] Filed: Oct. 14, 1988

[51] Int. Cl.[5] .............................................. H02M 1/00

[52] U.S. Cl. ................................... 363/146; 439/409; 439/687

[58] Field of Search ................ 363/146; 439/409, 686, 439/687, 691, 696, 350, 351, 352, 353, 467

[56] References Cited

U.S. PATENT DOCUMENTS

| | | | |
|---|---|---|---|
| 2,408,045 | 9/1946 | Cottrell | 439/409 |
| 3,237,079 | 2/1966 | Mas | 363/146 |
| 3,617,615 | 11/1971 | Balzer | 439/467 X |
| 4,312,634 | 2/1983 | Ritchie et al. | 439/696 X |
| 4,461,528 | 7/1984 | Durand et al. | 439/409 |
| 4,759,723 | 7/1988 | Siemon | 439/687 X |
| 4,842,546 | 6/1989 | Song | 439/409 |
| 4,846,720 | 7/1989 | Song | 439/409 X |
| 4,846,723 | 7/1989 | Pong | 439/686 X |

FOREIGN PATENT DOCUMENTS

| | | | |
|---|---|---|---|
| 1465264 | 5/1969 | Fed. Rep. of Germany | 439/696 |
| 0188372 | 10/1984 | Japan | 363/146 |

*Primary Examiner*—Steven L. Stephan
*Assistant Examiner*—Kristine Peckman
*Attorney, Agent, or Firm*—Richard W. Hanes

[57] ABSTRACT

An electrical power converter having an electrical transformer including a non-conductive bobbin carrying electrical windings, all of which is enclosed in a split housing forming top and bottom members, one of which members is an integrally formed latch disposed internally of the housing and adapted to fasten the top and bottom members together, and where the bobbin carries front and back structural extensions to make respective contact with the latch and the opposing rear wall of the housing and forming, with the bobbin, a compression brace to prevent unlocking movement of the latches after the top and bottom members have been mated together.

3 Claims, 2 Drawing Sheets

PLUG IN POWER CONVERTER STRUCTURE

BACKGROUND OF THE INVENTION

The present invention relates to electrical power converters and particularly to the means for permanently closing the housings therefor.

Transformers, or converters, to modify normal residential power of typically 110 volts to a lower voltage or different type of power have been in existence for a considerable period of time. Typically the transformer and other electrical components are enclosed within a housing having the two plug prongs protruding from the housing for insertion into an electrical receptacle. The converted power is supplied to an electrical load through conductors coming out of the housing. As with other electrical equipment, specifications and standards have been developed to insure that the housings for these power converters have the structural integrity to withstand certain shock loads and the ravages of age without popping open or even partially coming apart at the seam so as to expose the uninsulated wiring inside.

Manufacturing expedience dictates that the housing is formed of two pieces to enclose the transformer windings and other components. When assembled the two pieces are mated and welded together along the seam or parting line between the two housing pieces. Obviously, the necessity of welding, gluing or using other similar means of securing the two housing "halves" together places limitations on the materials which can be used and adds considerably to the time and cost of manufacturing assembly.

It is therefor the primary object of the present invention to provide a power converter housing which will satisfy the requirements of integrity of structure while at the same time eliminating the step of welding or gluing the mating housing pieces together.

A further object of the invention is to provide a power converter housing which is molded in one piece and which is closed by folding the top over the bottom, as with a suitcase, and which will self-latch into a permanent integral unitary structure.

Still other and further objects, features and advantages of the invention will become apparent upon a reading of the following detailed description of a preferred form of the invention taken in conjunction with the accompanying drawings in which.

Detailed Description

Figure 1:
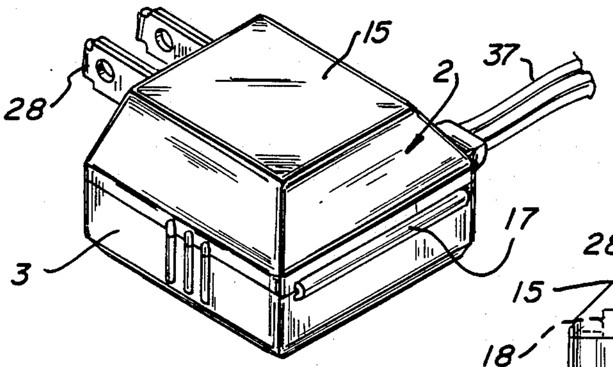
FIG. 1 is a perspective view of the power converter housing of the present invention shown in the closed and sealed position.
Figure 3:
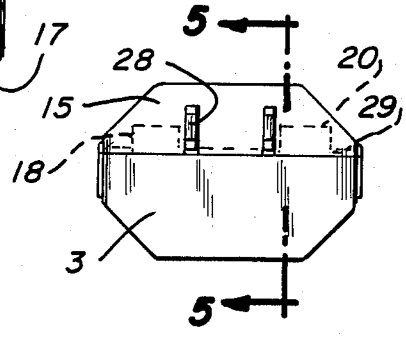
FIG. 3 is a front elevational view of the power converter with the housing in closed position.
Figure 2:
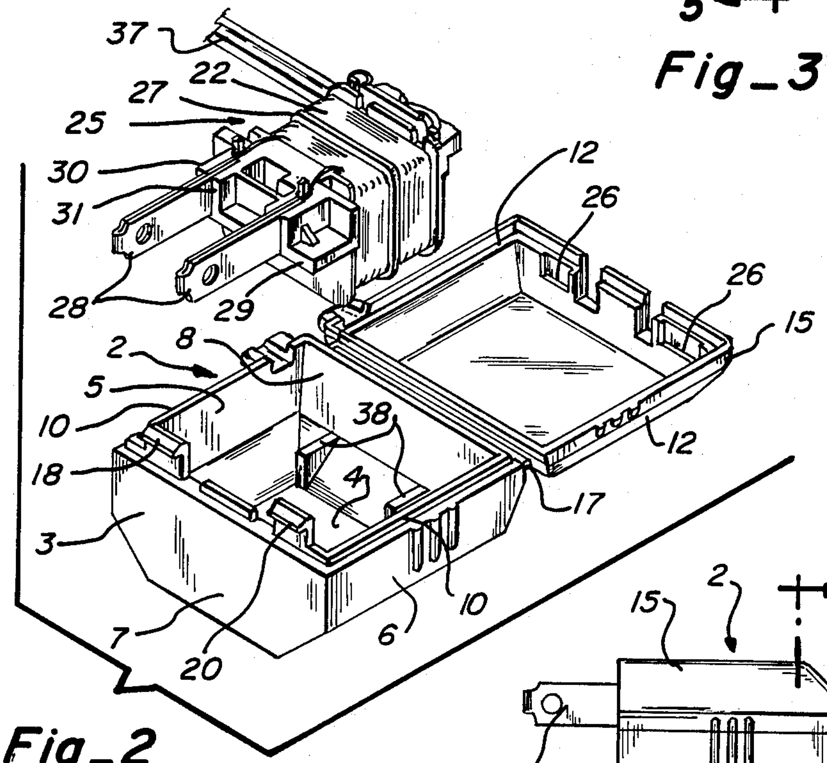
FIG. 2 is a perspective view of the power converter structure of the present invention showing the housing portion in the open position and the power converter itself shown in a raised position above the bottom portion of the housing.
Figure 4:
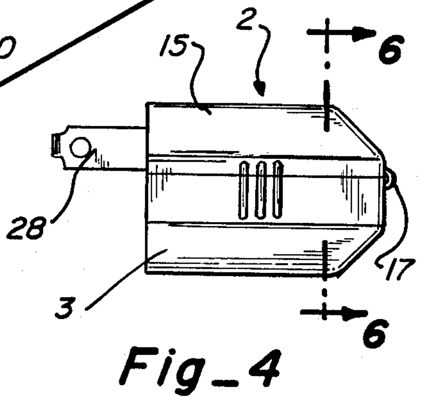
FIG. 4 is a side elevational view of the power converter with the housing in closed position.

Referring to FIG. 2, the housing 2 of the present invention is shown in the opened position prior to insertion of the components of the electrical power converter. The base portion 3 of the housing is in the form of an open or divided container having a flat bottom 4, upstanding side walls 5 and 6, a front wall 7 and a rear wall 8. An integral raised sealing lip 10 surmounts the four walls to conform with and fit into a mating recess 12 in the top covering lid 15. The base portion 3 is attached to the covering lid 15 with a thin web 17 of flexible material, preferably integrally formed of the same plastic material as the base and lid, forming a hinge therebetween.

Figure 8:
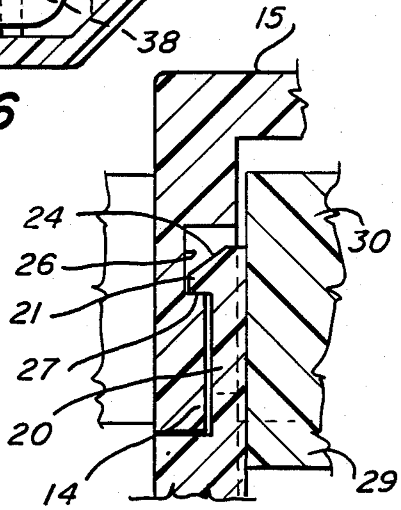
FIG. 8 is a fragmentary and enlarged cross-sectional view taken along lines 8/8 of FIG. 7.

In order to accomplish the primary object of the invention, there are provided two upstanding locking fingers 18 and 20 molded as an integral part of the front wall 7 of the base 3. The top of each finger forms a forwardly projecting latch 21. As seen best in FIG. 8, the top of the projecting latch is a sloped cam surface 24 made to contact the front lip 14 of the lid 15 as the lid is closed over the base 3. As the lip is forced down onto the cam surface 24 the front wall of the lid 15 is distorted outwardly allowing the lid to pass over the finger latches 21. Two channels or sockets 26 are provided on the inside of the front wall of the lid 15 which are positioned and dimensioned to receive the respective projecting latches 21 of the locking fingers 18 and 20. The flat underside 27 of each latch abuts one side of a channel 26 acting as a lock to prevent the lid 15 from being raised once the latch inserts itself into the channel. The elasticity of the finger material is such that once the channels 26 and the latches 21 are aligned the latches will be spring urged into the channels.

As so far described, the housing would close, lock and substantially comply with the appropriate integrity specifications. However, a further feature of the invention insures what otherwise might be uncertain as to the ability of the housing to withstand shock loads or prying forces which would tend to distort the case 2 sufficiently so that the nesting latches 21 would be separated from their sockets 26.

Figure 5:
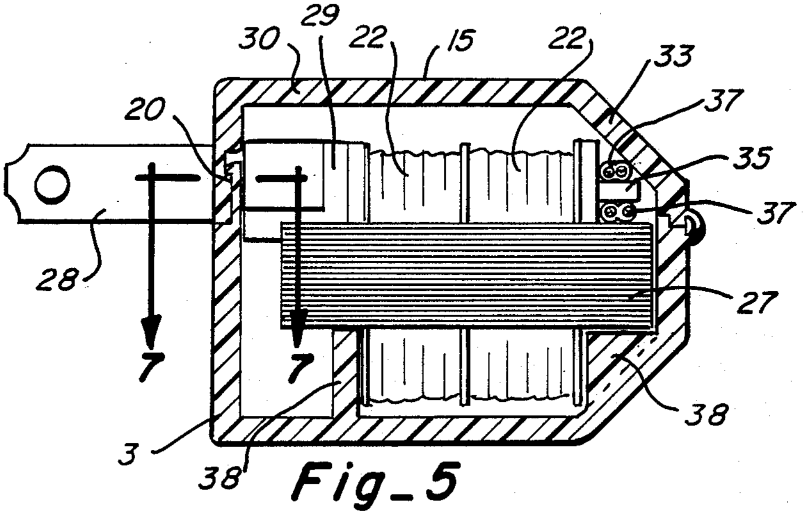
FIG. 5 is a cross-sectional view of the power converter taken along lines 5/5 of FIG. 3.

The power converter which is inserted into the housing case 2 is formed largely by an electrical transformer 25 having wire windings 22 on a non-conductive bobbin 27. The input voltage to the transformer is supplied by a pair of plugs 28 which are securely attached to and carried by the basic bobbin structure. As best seen in FIGS. 2 and 5, the central core of the bobbin 27 protrudes forwardly of the windings portion and supports a platform 29 upon which are mounted the plugs 28. Lateral stability for the plugs is achieved by vertical clamping walls 30 and 31 formed integrally with the supporting platform 29. The platform 29 and the plug clamping walls 30 and 31 are positioned and sized so as to directly bear against the back surface of the latches 18 and 20 when the transformer 25 is inserted in the bottom 3 of the housing 2. As seen in FIG. 5, as the top 15 of the case is closed over the bottom the sloping back wall 33 of the top portion 15 makes contact with the rear bobbin flanges 35 to push the transformer package 25 tightly up against the back sides of the latches 18 and 20. Once the cover is closed and the latch projections 21 are seated within the channel-like sockets 26 the compression brace member formed at the front end by the bobbin projection 29 and the associated vertical walls 30 and 31 in contact with the latches, the bobbin itself and the rear finger-like flanges in contact with the rear portion of the housing insure that the latches will not bend backwards and be dislodged. In addition to the absolute locking function established by the interface between the bobbin structure and the latches, the mounting of the bobbin on the integrally formed carrying pads 38 tends to stabilize and strengthen the entire housing once the cover 15 is closed and locked, giving the entire structure the strength and internal support necessary.

Figure 6:
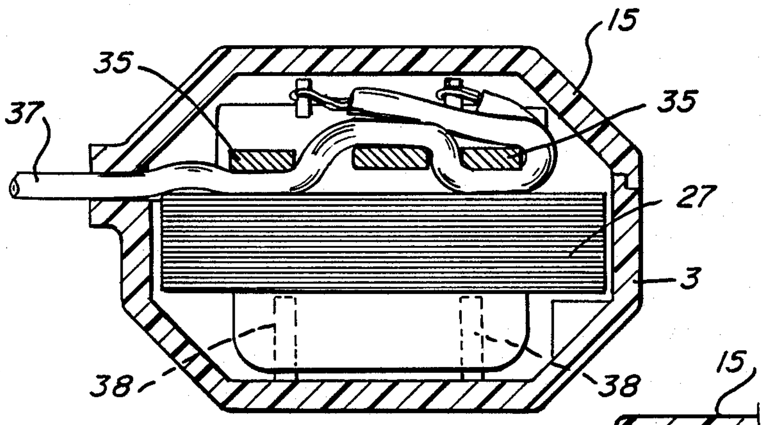
FIG. 6 is a cross-sectional view of the power converter taken along lines 6/6 of FIG. 4.
Figure 7:
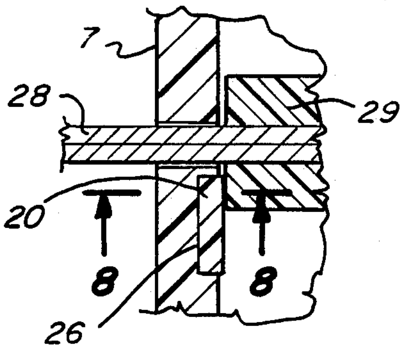
FIG. 7 is a fragmentary and enlarged cross-sectional view taken along lines 7/7 of FIG. 5.

In addition to the support given to the locking function by the finger flanges 35, as already set forth, these flanges provide an additional benefit of clamping the power output conductors 37, as seen in FIG. 6. The finger flanges 35 appear as the warp in a woven piece while the output power conductor is interlaced among the fingers forming a woof and securely maintaining the cord in fixed position so that knots in the conductors or special clamps are unnecessary to secure the power cord 37 against being pulled out of the case.

I claim:

1. An electrical plug comprising:

a split housing forming top, bottom and wall members, latch means disposed internally of the housing for fastening the top and bottom members of the housing together, an electrical component disposed, at least partially, within said housing and having rigid substructure means making contact with the latch means and an opposing wall member of the housing, forming a compression brace to prevent unlocking movement of the latch means.

2. A plug-in electrical power converter comprising:

an electrical transformer including a plurality of windings attached to input and output conductors and a non-conductive bobbin carrying the windings;

a split housing forming top, bottom and wall members to enclose the electrical transformer;

latch means disposed internally of the housing for fastening the top and bottom members together; and first and second extensions carried by the bobbin to make respective contact with the latch means and an opposing wall member of the housing and forming, with the bobbin, a compression brace to prevent unlocking movement of the latch means.

3. The combination of claim 2 wherein the said second bobbin extention comprises a plurality of fingers around which the output conductor is woven.

* * * * *